No. 871,613. PATENTED NOV. 19, 1907.
J. P. NESTE.
ADJUSTABLE TONGUE.
APPLICATION FILED OCT. 6, 1906.

WITNESSES
J. Nussb(at)
Rio Hardie

INVENTOR
James P. Neste
BY Munn & Co.
ATTORNEY

UNITED STATES PATENT OFFICE.

JAMES P. NESTE, OF LAKE MILLS, IOWA.

ADJUSTABLE TONGUE.

No. 871,613.  Specification of Letters Patent.  Patented Nov. 19, 1907.

Application filed October 6, 1906. Serial No. 337,722.

*To all whom it may concern:*

Be it known that I, JAMES P. NESTE, a citizen of the United States, and a resident of Lake Mills, in the county of Winnebago and State of Iowa, have invented a new and Improved Adjustable Tongue, of which the following is a full, clear, and exact description.

Figure 1:
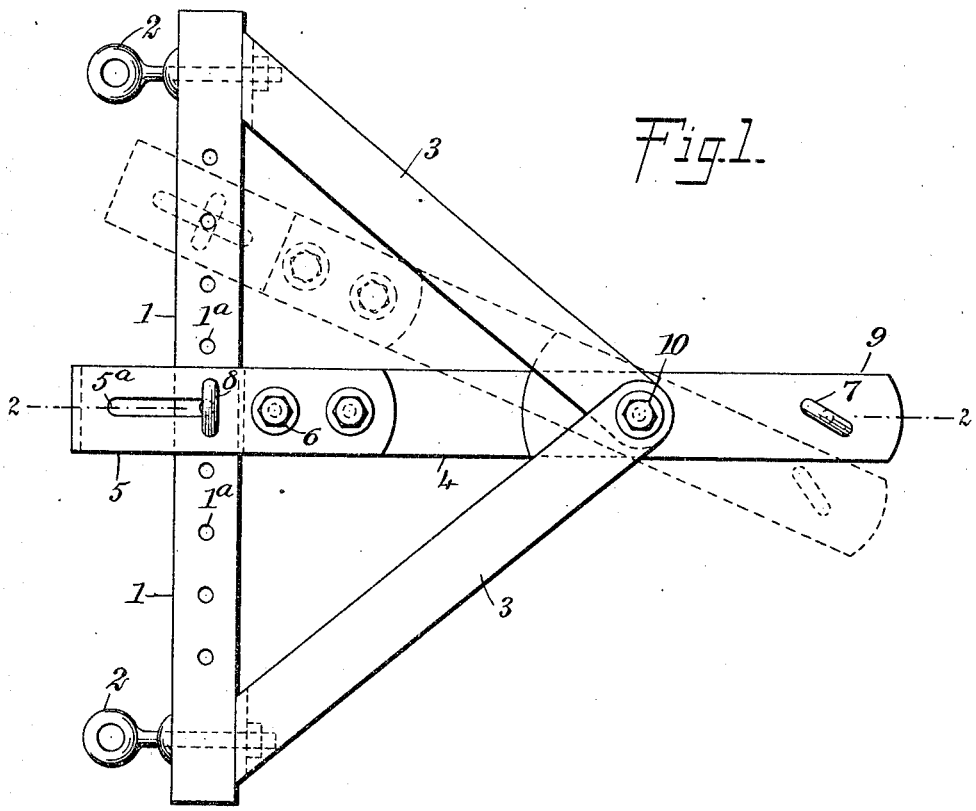
Figure 2:
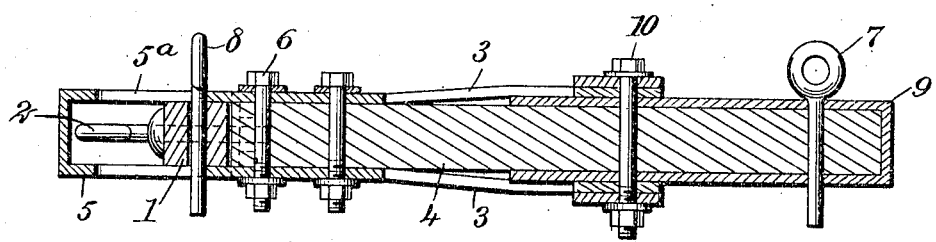
Figure 3:
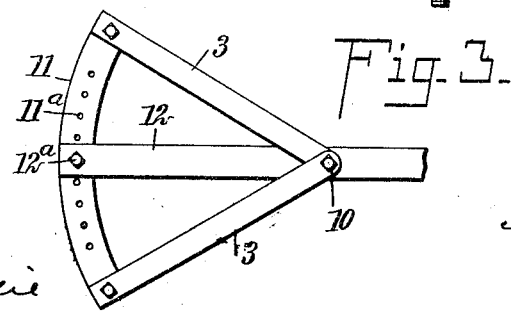

My invention relates to attachments adapted to be applied to threshing machines, separators and machines of a similar character, and to be connected to a traction engine, and has for its object to provide means whereby such machines may be turned in the desired direction in inconvenient places, and readily backed between grain stacks, and guided in narrow passage-ways. This I accomplish by the means illustrated in the accompanying drawings, in which drawings like characters of reference indicate like parts throughout the views, and in which Figure 1 is a plan of a device embodying my invention; Fig. 2 is a longitudinal vertical section taken on the line 2—2 of Fig. 1; and Fig. 3 is a plan of a modification of my invention.

As illustrated in the drawings, 1 represents a cross bar adapted to be secured to the axle of a threshing machine or separator, by means of draft eye-bolts 2, said bar being provided with a series of perforations 1ª. Braces 3 are secured at their rear ends to the cross bar and connected together at their forward ends, forming a frame, to which frame a stub tongue 4 is pivotally attached by means of a bolt 10, and the forward end of the tongue is preferably provided with a strap or band 9 covering said end, and with a perforation adapted to receive a coupling pin 7. The rear end of the tongue is provided with a yoke 5 preferably having a longitudinal slot 5ª adapted to receive a pin 8. The yoke 5 preferably extends around the bar 1 and is secured to the rear end of the tongue by means of bolts 6. By releasing the pin 8 from the yoke 5, the rear end of the tongue may be adjusted at any desired point longitudinally of the cross bar 1, and secured in any desired position by inserting the pin 8 through the recess 5ª and a perforation 1ª at the desired point in the cross bar.

I prefer in most instances to use an arc cross bar 11, provided with perforations 11ª, adapted to receive a locking pin or bolt 12ª, also passing through the tongue 12, thereby dispensing with the slotted yoke 5, or extension of the stub pole 4.

Having thus described the invention, what I claim as new and desire to secure by Letters Patent is:

The combination with a tongue provided on one end with a rearwardly extending yoke having its ends secured to said tongue, and provided with a longitudinal slot, a cross bar arranged within said yoke and provided with a series of apertures, braces secured to said cross bar and tongue, and a locking pin engaging the apertures of said yoke and cross bar.

In testimony whereof I have signed my name to this specification in the presence of two subscribing witnesses.

JAMES P. NESTE.

Witnesses:
  LEWIS P. NESTE,
  BENNIE FROE.